(12) United States Patent
Takahashi et al.

(10) Patent No.: US 7,557,333 B2
(45) Date of Patent: Jul. 7, 2009

(54) OPTICAL SIGNAL RECEIVING CIRCUIT AND OPTICAL SIGNAL RECEIVING APPARATUS

(75) Inventors: Hideyuki Takahashi, Hachioji (JP); Hiroyuki Yoshioka, Akishima (JP); Hidefumi Yoshida, Ome (JP); Shogo Irikura, Fussa (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 11/709,711

(22) Filed: Feb. 23, 2007

(65) Prior Publication Data

US 2007/0212081 A1   Sep. 13, 2007

(30) Foreign Application Priority Data

Mar. 8, 2006  (JP) ............................. 2006-061996

(51) Int. Cl.
H01J 40/14 (2006.01)
H03F 3/08 (2006.01)

(52) U.S. Cl. .............................. 250/214 R; 250/214 A; 250/214 C; 330/308

(58) Field of Classification Search ............. 250/214 R, 250/214 A, 214 LA, 214 AG, 214 C; 330/59, 330/110, 308, 261; 327/514
See application file for complete search history.

(56) References Cited

U.S. PATENT DOCUMENTS 5,068,621 A * 11/1991 Hayward et al. ............ 330/253
5,801,588 A   9/1998 Nishiyama et al.
7,183,859 B2 * 2/2007 Visocchi et al. ............ 330/308

FOREIGN PATENT DOCUMENTS

JP   9-232877   9/1997

OTHER PUBLICATIONS

Analog Devices, 11.1 Gbps 3.3V Transimpedance Amplifier, pp. 1-8, 2004.

* cited by examiner

Primary Examiner—Kevin Pyo
(74) Attorney, Agent, or Firm—Mattingly & Malur, P.C.

(57) ABSTRACT

An optical signal receiving circuit has a current-voltage converting circuit which receives the output current signal of a photoelectric converting circuit, converting an optical signal into the current signal, and converts the current signal into a voltage signal. A differential circuit in the subsequent stage to the current-voltage converting circuit uses a resistor as its current source to facilitate setting of an operating voltage level in the circuit. To eliminate an adverse effect of asymmetry of the output waveform from the differential circuit due to the use of the resistor, the reference voltage level as the other input to the reference circuit is generated from the output voltage signal of the current-voltage converting circuit by a voltage generating circuit incorporating a feed-forward-controlling connection. Thus, coexistence of high bandwidth characteristics and broad dynamic range having so far been difficult to attain by low voltage apparatus can be realized.

10 Claims, 8 Drawing Sheets

SOLID LINE: INT
BROKEN LINE: INB

MISMATCH OF REFERENCE VOLTAGE

TIME DOMAIN WAVEFORM DISTORTION

SOLID LINE: OUTT
BROKEN LINE: OUTB

OPTICAL SIGNAL RECEIVING CIRCUIT AND OPTICAL SIGNAL RECEIVING APPARATUS

CLAIM OF PRIORITY

The present application claims priority from Japanese application JP 2006-061996 filed on Mar. 8, 2006, the content of which is hereby incorporated by reference into this application.

FIELD OF THE INVENTION

The present invention relates to an optical signal receiving circuit for converting an optical signal into differential voltage signals and, more particularly, relates to an optical signal receiving circuit operable with a single low-voltage power supply of 3.3 V or the like.

BACKGROUND OF THE INVENTION

With recent development of widespread use of optical communications, demands are becoming strong for higher-speed transmitting and receiving circuits. Also, small low-voltage and low-power-consumption circuits are highly demanded from the point of view of cost reduction and energy saving.

In optical signal receiving circuits and optical signal receiving apparatuses, such an amplifier is generally needed that performs photoelectric conversion of the optical signal by the use of a photoelectric converter, such as a photodiode, amplifies the weak current signal output therefrom, and converts the amplified signal into an electric signal, especially differential voltage signals.

Accordingly, operability with a single low-voltage power supply has come to be demanded to such an amplifier in view of cost reduction and energy saving.

In JP09-232877A is disclosed a preamplifier for optical communication operable with a single low-voltage power supply. Especially in FIG. 1 of JP09-232877A, there is shown an example in which the source and the drain of a field-effect transistor (FET) are connected to each end of a feedback resistor of a current-voltage converting circuit employing a trans-impedance amplifier (TIA), and thus the output voltage amplitude of the current-voltage converting circuit is controlled.

In the data sheet of the product ADN2821, Analog Devices, Inc., is described a trans-impedance amplifier for optical communication. FIG. 1 in the data sheet, in particular, describes a feedback connection from the output of the differential amplifier to the input of the differential amplifier.

SUMMARY OF THE INVENTION

Prior to submission of this application, we made a consideration about a technology of semiconductor circuit operable with a single low-voltage power supply of 3.3 V or the like for converting an optical signal into differential voltage signals. In order to support high-speed communication employing an optical signal, operability in the range of bandwidth of the signal frequency is required to the current-voltage converting circuit, and in order to support long distance transmission, sensitivity to receive an attenuated, weak signal is required also. FIG. 3 shows a circuit configuration that was considered by the inventors and FIG. 4 shows a circuit example of its partial block.

As the current-voltage converting circuit, a trans-impedance amplifier 10 is used here.

Referring to the circuit of FIG. 4, an increase in the resistance value of the feedback resistor 11 has a beneficial effect on improvement in the noise characteristic determining the minimum input sensitivity.

However, the output voltage amplitude of the trans-impedance amplifier 10 is given by input current amplitude multiplied resistance value of feedback resistor 11, and therefore, if the value of the feedback resistor 11 is increased, the output voltage amplitude becomes large, and this affects the operating limit of the circuit when a large signal is input thereto (this operating limit may hereinafter be called "overload limit.") Accordingly, in order to keep a dynamic range of the circuit to satisfy the conditions for the demanded minimum input sensitivity and the overload limit, an issue arises how to suppress the effect of an increase in the value of the feedback resistor 11 on the overload limit.

To expand the range under the overload limit, the setting of the output voltage level of the trans-impedance amplifier 10 has a great significance. The amount of electric current flowing through the Tr. 13 is determined by the resistance value of the resistor 14, the power supply voltage, and the voltage level at the base of Tr. 15. It is essential for the operation of the trans-impedance amplifier that there is a flow of the current of a predetermined value or above. Therefore, the voltage level at the base of Tr. 15 should be set to be lower than the power supply voltage. The output voltage level of the trans-impedance amplifier 10 is equal to the voltage level at the base of the Tr. 15 less the base-emitter voltage (hereinafter referred to as VBE) of the Tr. 15. In the case where a large signal is input, since it is needed to satisfy the condition with the voltage signal, the average voltage level of the output of the trans-impedance amplifier 10 need to be further reduced by ½, or above, of the voltage signal amplitude. Generally, the VBE of a transistor varies according to temperature change, and it becomes 1 V or so at low temperature. If a case is considered where the power supply voltage VCC is 3 V, and the output voltage amplitude of the trans-impedance amplifier 10 becomes 1.2 V when a large signal is input, the output average voltage level of the trans-impedance amplifier 10 needs to be set to $$3 - VBE - 1.2 \div 2 = 3 - 1 - 0.6 = 1.4 \ [V]$$

or below.

Meanwhile, in a differential circuit 20 at the subsequent stage, reference voltage level which is same level as the output average voltage level of the trans-impedance amplifier 10, is applied to the transistor 22 as its base voltage level. Therefore, the minimum voltage applied to the current source 2 is determined by the output average voltage level of the trans-impedance amplifier 10 less the VBE of the Tr. 22:

$$1.4 - VBE = 1.4 - 1 = 0.4 \ [V].$$

When a constant current source employing a transistor is used as the current source, it becomes impossible to keep a bias voltage necessary for operating the transistor at high speed and keep the operating bandwidth range of the circuit and, as a consequence, the overload limit becomes low.

From the above, while the setting of the resistance value of the feedback resistor 11 need to be made on the basis of tradeoff between the noise characteristic and the overload limit, in the case of the single low-voltage power supply circuit that was considered prior to the present application, it was found difficult to set the resistance value of the feedback resistor 11 keeping necessary dynamic range.

A circuit with an AGC (Automatic Gain Control) circuit applied to a current-voltage converting circuit for keeping the dynamic range is shown in FIG. 1 in JP09-232877A. When this circuit is used, however, deterioration of bandwidth occurs due to parasitic capacitance of the field-effect transistor added to make the feedback resistance variable. Therefore, a tradeoff arises between acquirement of a dynamic range and the bandwidth characteristic. Hence, in the optical signal receiving circuit considered prior to the present application, it was found difficult to make them coexist.

One of typical examples of the optical signal receiving circuit of the invention will be disclosed as follows: The circuit has a current-voltage converting circuit receiving the current signal output from a photoelectric converting circuit, which converts an optical signal into the current signal, for converting the current signal into a voltage signal, a differential circuit provided in the stage subsequent to the current-voltage converting circuit employs a resistor as its current source, and a reference voltage level to be supplied to the other input of the differential circuit is generated from the voltage signal output from the current-voltage converting circuit.

By use of a resistor as the current source in the differential circuit provided in the stage subsequent to the current-voltage converting circuit, it is made possible to lower the output voltage level of the current-voltage converting circuit, and thus realization of required dynamic range can be facilitated and the adverse effect on the bandwidth characteristic can be reduced.

More concretely, the optical signal receiving circuit of the invention is an optical signal receiving circuit receiving an electric signal generated by photoelectric conversion of an optical signal, converting the electric signal into a differential voltage signal, and outputting the differential voltage signal. The optical signal receiving circuit is configured to be operable with a single voltage power supply and adapted to generate a differential voltage signal by single-differential conversion, through a feed-forward connection, of a common voltage signal generated by current-voltage conversion of the aforesaid current signal.

Further, the optical signal receiving circuit of the present invention includes a current-voltage converting circuit receiving the current signal output from a photoelectric converting circuit receiving an optical signal and converting the optical signal into the current signal, as an input thereto and converting the current signal into a voltage signal, a voltage generating circuit receiving the voltage signal output from the current-voltage converting circuit as an input thereto and generating a DC voltage from the voltage signal, and a first differential circuit receiving a first voltage signal output from the current-voltage converting circuit and a second voltage signal output from the voltage generating circuit as input thereto and generating a differential voltage signal from the first and second voltage signals. The first differential circuit includes at least a pair of differential transistors and a current source commonly connected to the pair of transistors and uses a resistor, not a transistor, as the current source.

An optical signal receiving apparatus of the invention includes a photoelectric converting circuit receiving an optical signal and converting the signal into a current signal and an optical signal receiving circuit for generating a reference voltage signal from the current signal output from the photoelectric converting circuit and outputting the signal. The optical signal receiving circuit includes a current-voltage converting circuit receiving the current signal output from the photoelectric converting circuit as an input thereto and converting the current signal into a voltage signal, a voltage generating circuit receiving the voltage signal output from the current-voltage converting circuit as an input thereto and generating a DC voltage from the voltage signal, and a first differential circuit receiving a first voltage signal output from the current-voltage converting circuit and a second voltage signal output from the voltage generating circuit as inputs thereto and generating a differential voltage signal from the first and second voltage signals. The first differential circuit includes at least a pair of differential transistors and a current source commonly connected to the pair of transistors and uses a resistor, not a transistor, as the current source.

A typical advantage obtained from the above means is that an optical signal receiving circuit and apparatus adapted operable with a single low voltage power supply can be realized.

DETAILED DESCRIPTION OF THE PREFERRED EMBODIMENTS

The embodiments of the present invention will be described in detail with reference to the accompanying drawings. The circuit elements constituting each block of the embodiments may be formed by known integrated circuit technology, though not limited thereto, on a single semiconductor substrate of such a material as single crystal silicon or, in the case of a part high-frequency characteristics thereof are not required, may be separately provided as an external part. While, in some embodiments, a circuit using an NPN-bipolar transistor is shown, this is not limitative but the present invention may be applicable to circuits employing common semiconductor devices. Each of the devices shown may also be realized to exhibit the characteristics required thereof by parallel or series connections of the same devices or the same kind of devices.

First Embodiment

Figure 1A:
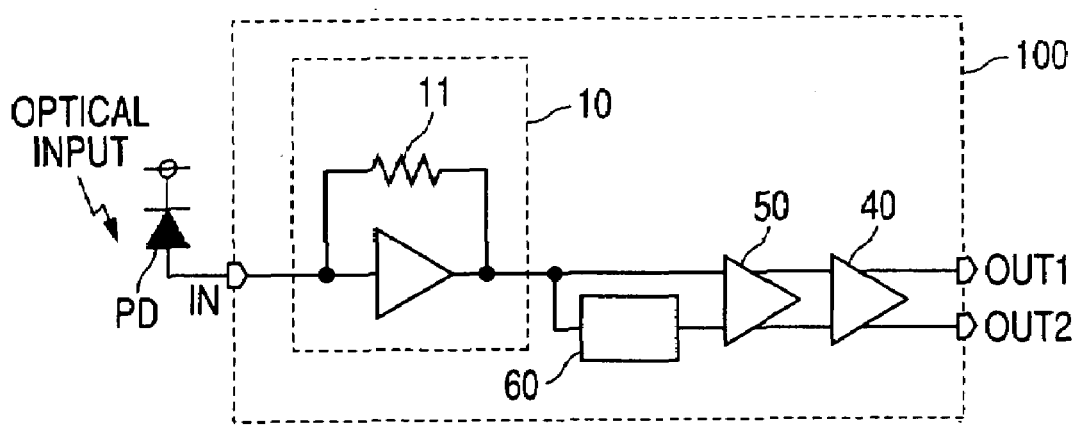
FIG. 1A is a drawing showing an overview of the entire configuration of an optical signal receiving circuit 100 and an optical signal receiving apparatus including the same.

FIG. 1 shows a first embodiment of the optical signal receiving circuit to which the invention is applied. The optical signal receiving circuit 100 of the present embodiment includes a current-voltage converting circuit 10 receiving the current signal output from a photoelectric converting circuit PD, photodiode, receiving an optical signal and converting the signal into the current signal, as an input signal thereto and converting the current signal into a voltage signal, a voltage generating circuit 60 receiving the voltage signal output from the current-voltage converting circuit 10 as an input thereto and generating a DC voltage from the voltage signal, and a first differential circuit 50 receiving a first voltage signal output from the current-voltage converting circuit 10 and a second voltage signal output from the voltage generating circuit 60 as inputs thereto and generating a differential voltage signal from the first and second voltage signals. The first differential circuit 50 includes one pair of differential transistors 21, 22 and a current source 3 commonly connected to the pair of transistors 21, 22, in which a resistor is used as the current source 3.

Further, the optical signal receiving apparatus of the present embodiment includes a photoelectric converting circuit PD receiving an optical signal and converting the signal into a current signal and the optical signal receiving circuit 100 generating a differential voltage signal from the current signal output from the photoelectric converting circuit PD and outputting the signal.

Figure 1B:
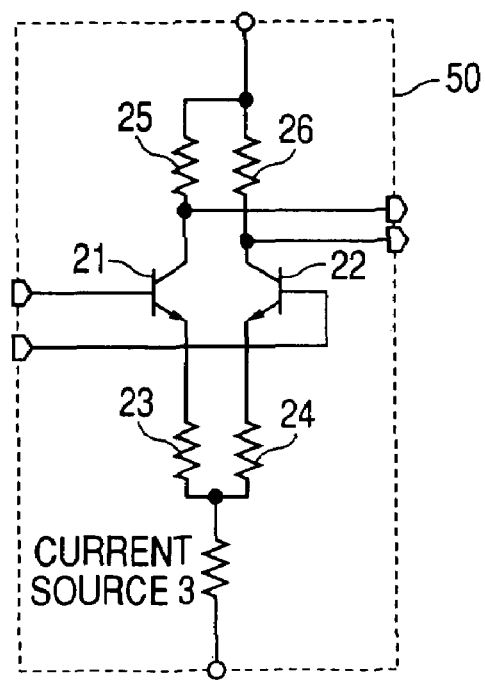
FIG. 1B is a circuit diagram showing an example of the differential circuit 50 in FIG. 1A.
Figure 1C:
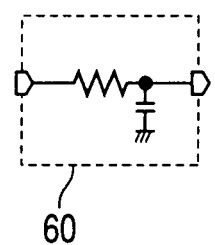
FIG. 1C is a circuit diagram showing an example of the voltage generating circuit 60 in FIG. 1A.
Figure 3:
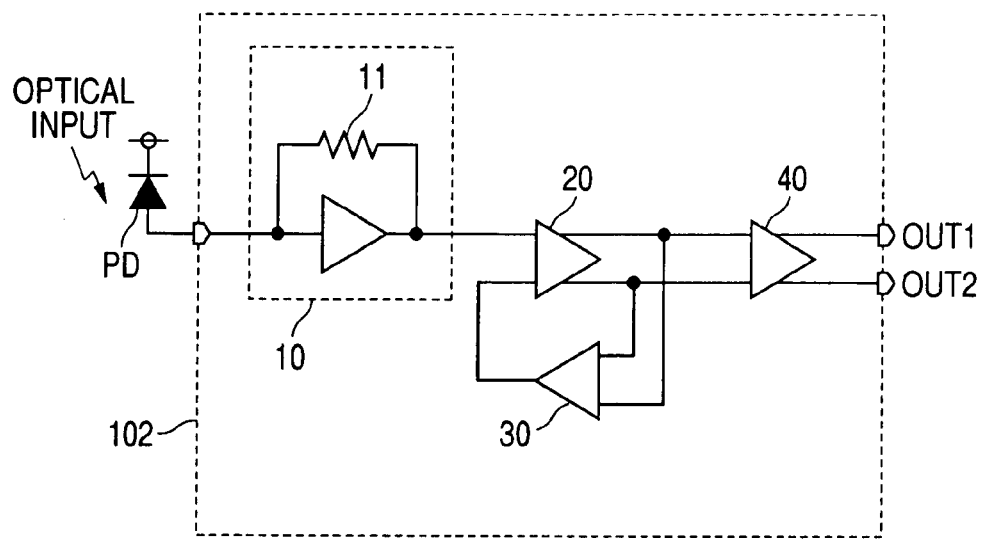
FIG. 3 is a configuration diagram showing an optical signal receiving circuit considered by the inventors.
Figure 4:
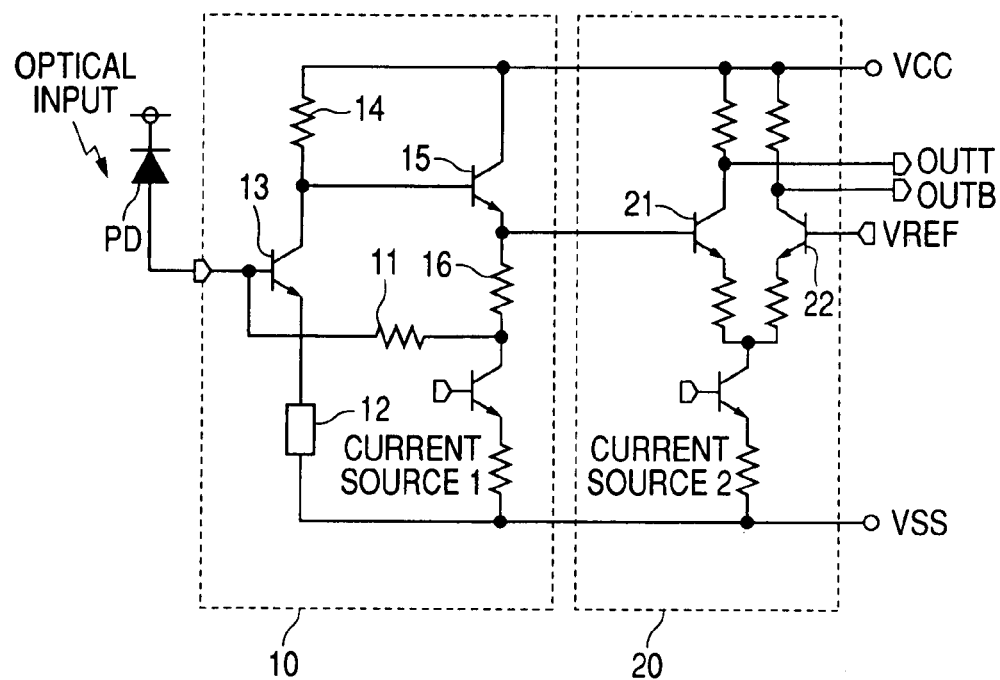
FIG. 4 is a circuit diagram showing an example of the current-voltage converting circuit 10 and the differential circuit 20 in FIG. 3.

To be more concrete, the receiving circuit of the present embodiment is configured such that a trans-impedance amplifier 10 as the current-voltage converting circuit is connected to the output of a photodiode (PD) as the photoelectric converting circuit, the output of the trans-impedance amplifier 10 is connected to the voltage generating circuit 60 and to one input of the differential circuit 50, and the output of the voltage generating circuit 60 is connected to the other input of the differential circuit 50. Another differential circuit 40 may further be provided such that the output of the differential circuit 50 is connected to the differential circuit 40. Here, the voltage generating circuit 60 may be configured of a low-pass filter (LPF) employing, for example, a resistor and a capacitor as shown in FIG. 1C. Further, the differential circuit 50 may be configured, for example, as shown in FIG. 1B, in which the input signals are connected to a pair of transistors Tr. 21, Tr. 22, the transistors are respectively connected to collector resistors 25, 26 and emitter resistors 23, 24, and the emitter resistors 23, 24 are commonly connected to the current source 3 determining the current flowing through the differential circuit 50. This configuration differs from FIG. 3 in that the output of the trans-impedance amplifier 10 is used as the input to the voltage generating circuit 60 and, further, the circuit configuration differs from FIG. 4 in that the current source 3 is configured of a resistor. In other words, the current source 3 is configured in such a way that a current passing through the current source 3 varies according to the voltage signal input to INT.

Operation of the first embodiment will be described below.

Figure 5:
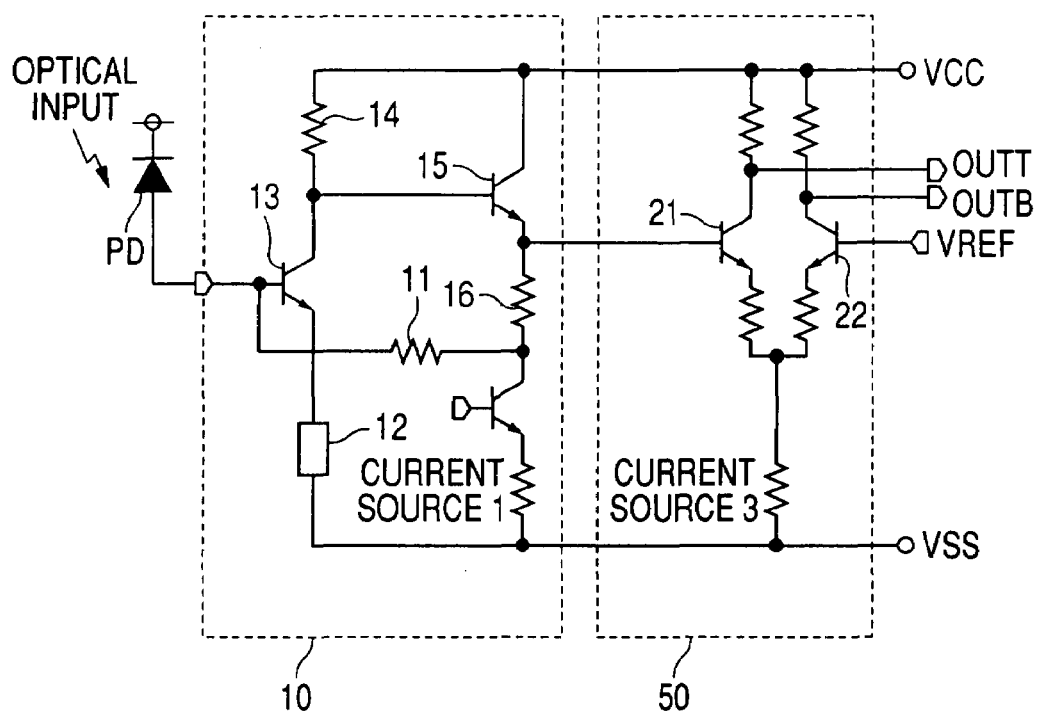
FIG. 5 is a circuit diagram showing an example of the current-voltage converting circuit 10 and the differential circuit 20 in FIGS. 1 and 2.

The optical signal receiving circuit 100 receives a current signal, generated based on an input optical signal by photoelectric conversion, at its terminal IN, converts the current signal into a differential voltage signal through the trans-impedance amplifier 10 and differential circuit 50, and outputs the signal. The optical signal receiving circuit 100 is configured to be operable with a single voltage power supply. Especially, the trans-impedance amplifier 10 and the differential circuit 50 are supplied with the same power supply voltage VCC (see FIG. 5.). Furthermore, the optical signal receiving circuit 100 is configured to be adapted to generate a differential voltage signal by differential conversion through a feed-forward connection of a common voltage signal that is generated from the voltage signal made by current-voltage conversion of the current signal.

A more concrete description will be given as follows. An optical signal input to the PD is converted by the PD into an electric signal and the electric signal is converted by the trans-impedance amplifier 10 into a voltage signal. While this voltage signal is input to the differential circuit 50, it is also input to the voltage generating circuit 60 so that an average voltage level is generated from the DC voltage component of the input voltage signal. The average voltage level is input to the differential circuit 50 as a reference voltage level and thus the differential voltage signal is generated in the differential circuit 50. In the case where the differential circuit 40 is additionally provided, the differential voltage signal output from the differential circuit 50 is input to the differential circuit 40 so that the differential voltage waveform is waveshaped or amplified.

Figure 6:
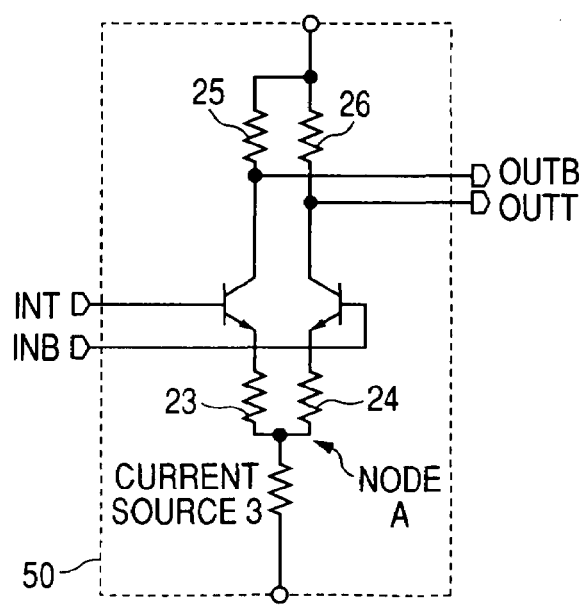
FIG. 6 is a circuit diagram of a differential circuit 20 to which the invention is applied.

FIG. 6 shows an example of a differential circuit using a resistor as the current source. In other words, the current source 3 has no transistors. In this case, INT receives the voltage signal output from the current-voltage converting circuit in the preceding stage, while INB receives the reference voltage level for converting a single phase signal into a differential signal.

Figure 7:
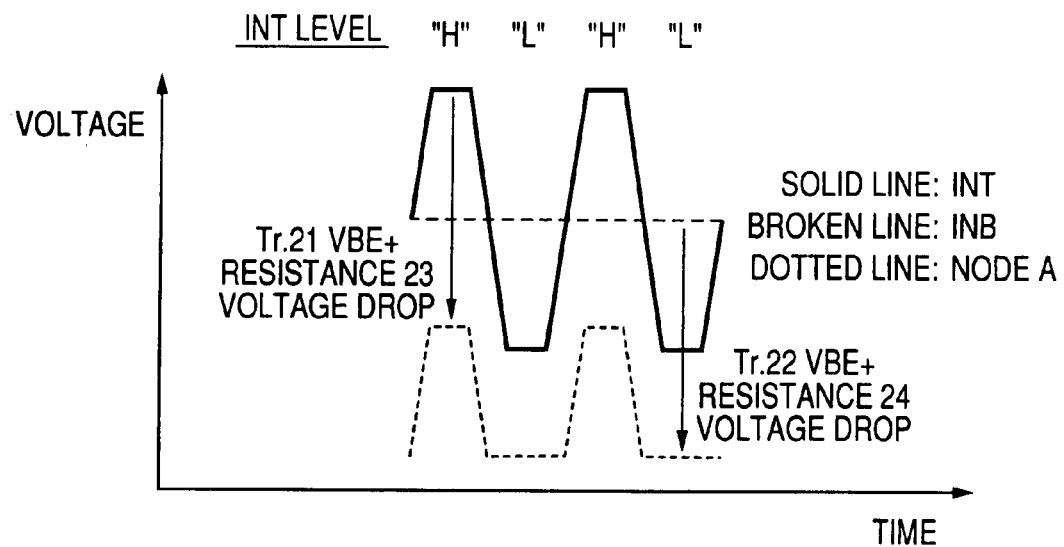
FIG. 7 is an example of input waveform to the differential circuit of FIG. 6.

FIG. 7 shows the input waveforms occurring at this time and the voltage waveform at the node A. Since the input to INB has a constant voltage level, the waveform at the node A is determined, when INT is at "H" level, on the basis of the "H" level, whereas the same is determined, when INT is at "L" level, on the basis of the reference voltage level at INB. Accordingly, the amount of current generated by the current source 3 differs on different occasions. Therefore, the amount of current flowing through the resistor 25 and the resistor 26 determining the "L" level in the differential output differs, thereby causing a phenomenon in which the "L" levels output to OUTT and to OUTB differ.

Figure 8:
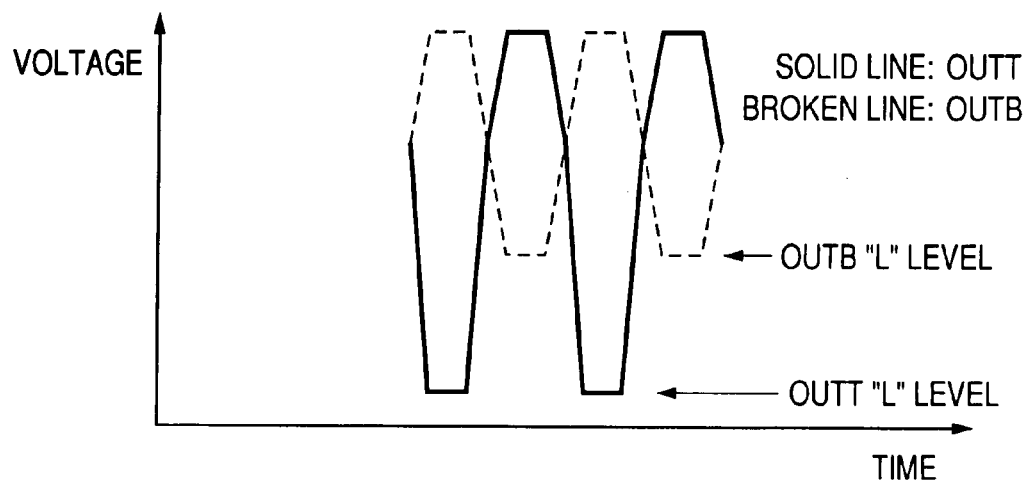
FIG. 8 shows an output waveform responsive to the input waveform of FIG. 7 input to the differential circuit of FIG. 6.

FIG. 8 shows the output waveform occurring at this time at OUTT, OUTB. When the waveform becomes asymmetric, like in this case, the method of generating the reference voltage level causes an issue. For example, when a method of generating a reference voltage level from the output of a differential circuit for use as the input to the same differential circuit, as shown in FIG. 1 in the data sheet of the product ADN2821, Analog Devices, Inc., as a conventional art example different from this embodiment, the reference voltage level is generated so as to satisfy $$\int (Voutt - Voutb) dt = 0.$$

Thus, a phenomenon occurs in which the generated reference voltage level is mismatched from the center of the amplitude that is input to INT.

Figure 9:
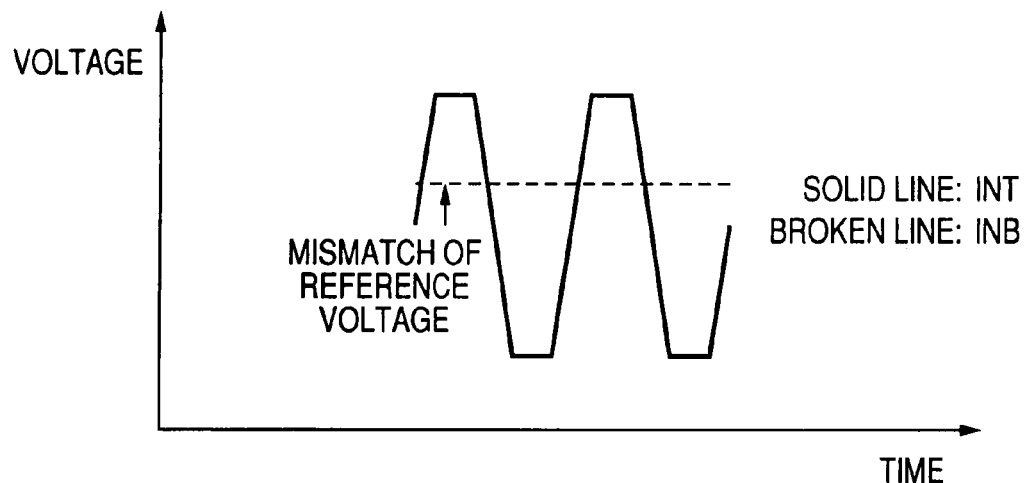
FIG. 9 is an example of input waveform to the differential circuit of FIG. 6.

FIG. 9 shows the input waveform at this time; thus, the voltage waveform output from the differential circuit 50 becomes further distorted.

Figure 10:
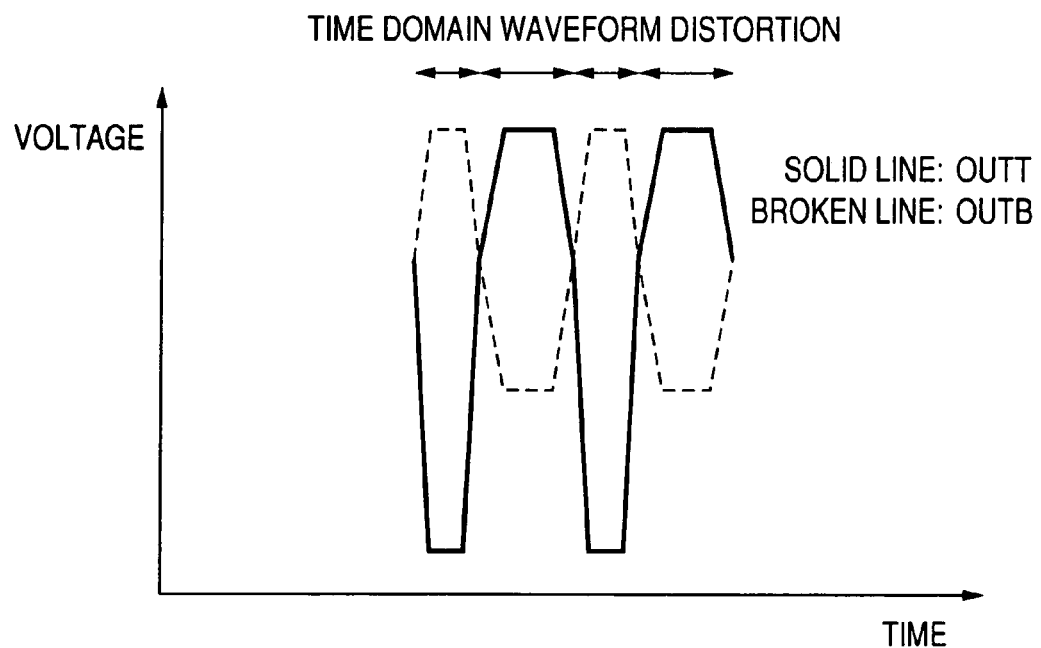
FIG. 10 shows an output waveform responsive to the input waveform of FIG. 9 input to the differential circuit of FIG. 6.

FIG. 10 shows the output waveform at this time. A time domain distortion is generated in the differential output signal due to -the mismatch of the reference voltage level from the center of the amplitude and, thereby, a phenomenon occurs in which the duty of the output waveform(the ratio between "H" level time and "L" level time in an alternating signal) deviates from 50%. Thus, if these output waveforms are used as the inputs, there is possibility of trouble occurring in the operation in the subsequent circuits.

The problem of "duty" is caused by the generation of the reference voltage level from the output of the circuit subsequent to the differential circuit outputting asymmetric waveform. The problem may be dissolved by generating the reference voltage level by using, as in the present embodiment, the output of the current-voltage converting circuit incorporating a feed-forward connection.

Figure 11A:
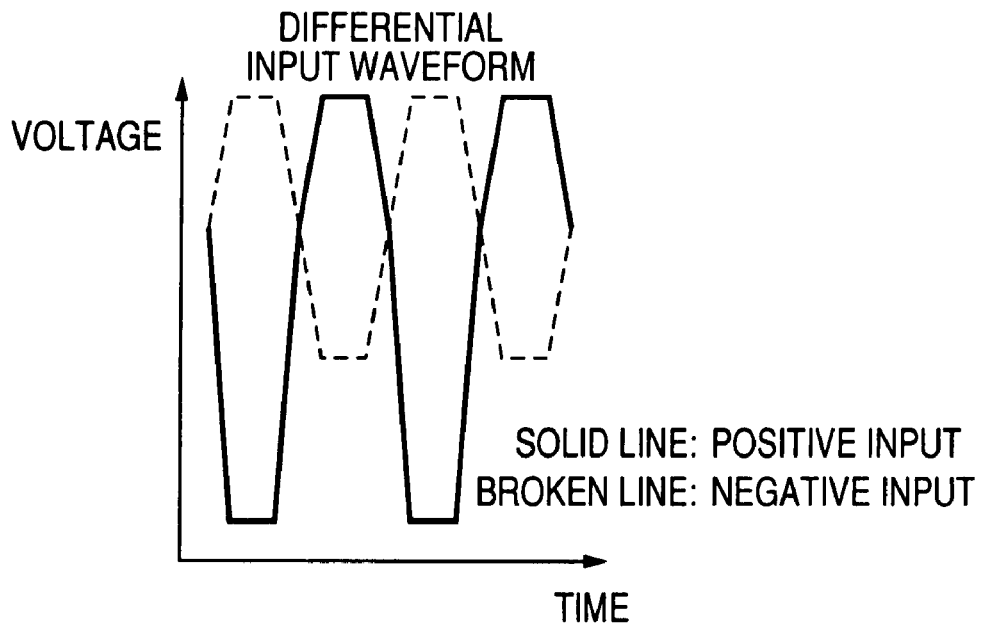
FIG. 11A is an input waveform to the differential circuit 40.
Figure 11B:
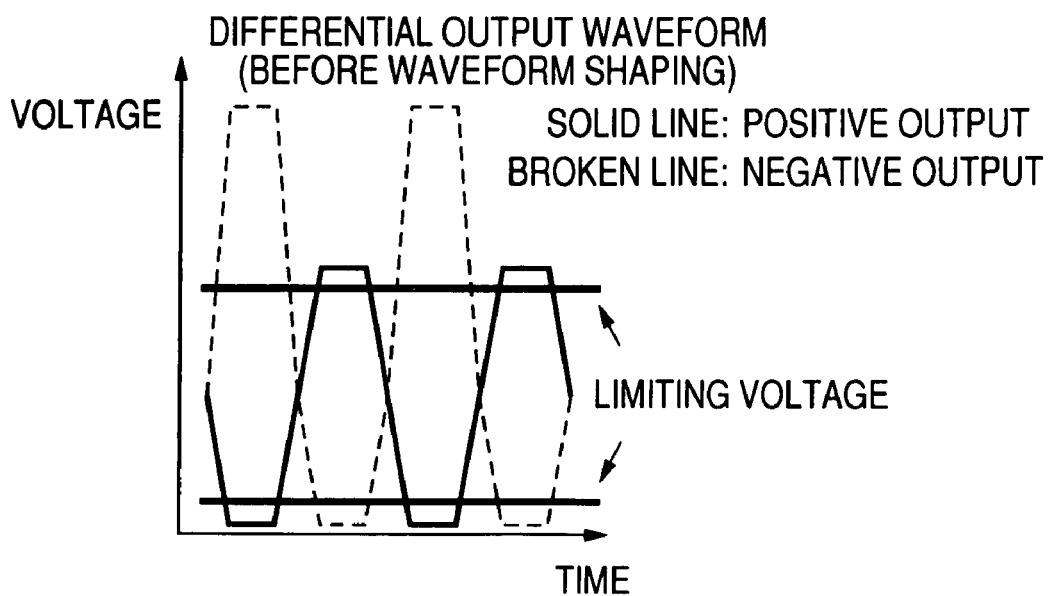
FIG. 11B shows an output waveform, before waveform shaping, responsive to the input waveform of FIG. 11A input to the differential circuit 40.

FIG. 11A shows the waveform, when the differential circuit 40 is provided, of the input to the differential circuit 40. FIG. 11B shows the output waveform obtained by amplifying the input waveform through the differential circuit 40. By setting small (appropriately) the limiting voltage amplitude of the differential circuit 40 to be applied to the above referred amplified output amplitude, waveform shaping to eliminate the asymmetry between the low and high levels of the pair of differential signals can be realized.

Figure 11C:
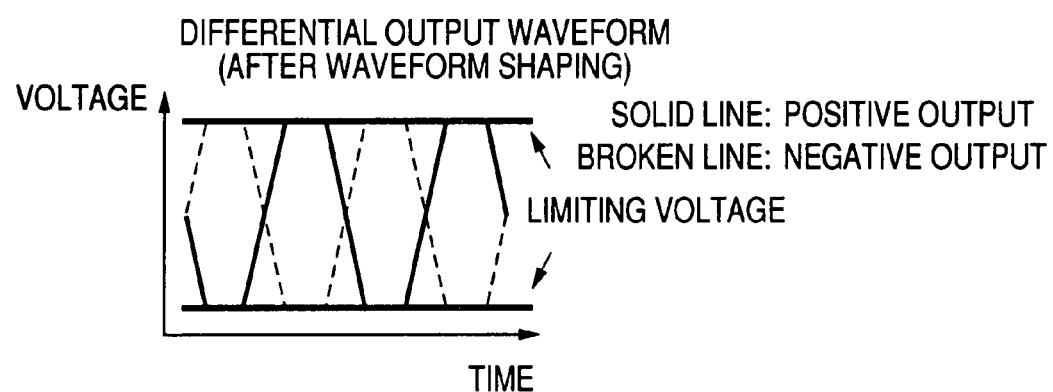
FIG. 11C shows an output waveform of the output waveform of FIG. 11B after waveform shaping through the differential circuit 40.

FIG. 11C shows an output waveform obtained when the limiting voltage amplitude for the differential circuit 40 is set as shown in FIG. 11B.

By providing the differential circuit 40 in this way, the asymmetry of the waveform in the amplitude can be eliminated.

By using the method to generate the reference voltage level by the use of the output of the current-voltage converting circuit incorporating the above referred feed-forward connection and using the method of suitably setting the limiting voltage amplitude for the differential circuit 40, it becomes possible to generate an output waveform free from distortion even when a differential circuit, which employs a resistor as the current source as shown in FIG. 6, is used as the differential circuit 50.

According to the present embodiment, it becomes possible to set the bias voltage needed for the current source of the differential circuit 50 to a low value and to lower the input voltage to the differential circuit 50. Thereby, the adjustment range of the output voltage of the trans-impedance amplifier 10 can be enlarged and, by attaining the optimum setting, the overload limit can be enlarged. Further, without limiting the output amplitude in the trans-impedance amplifier 10, the output can be input to the differential circuit 50 in the subsequent stage. Thus, adverse effects on the noise characteristic and frequency bandwidth characteristic can be eliminated.

Second Embodiment

Figure 2:
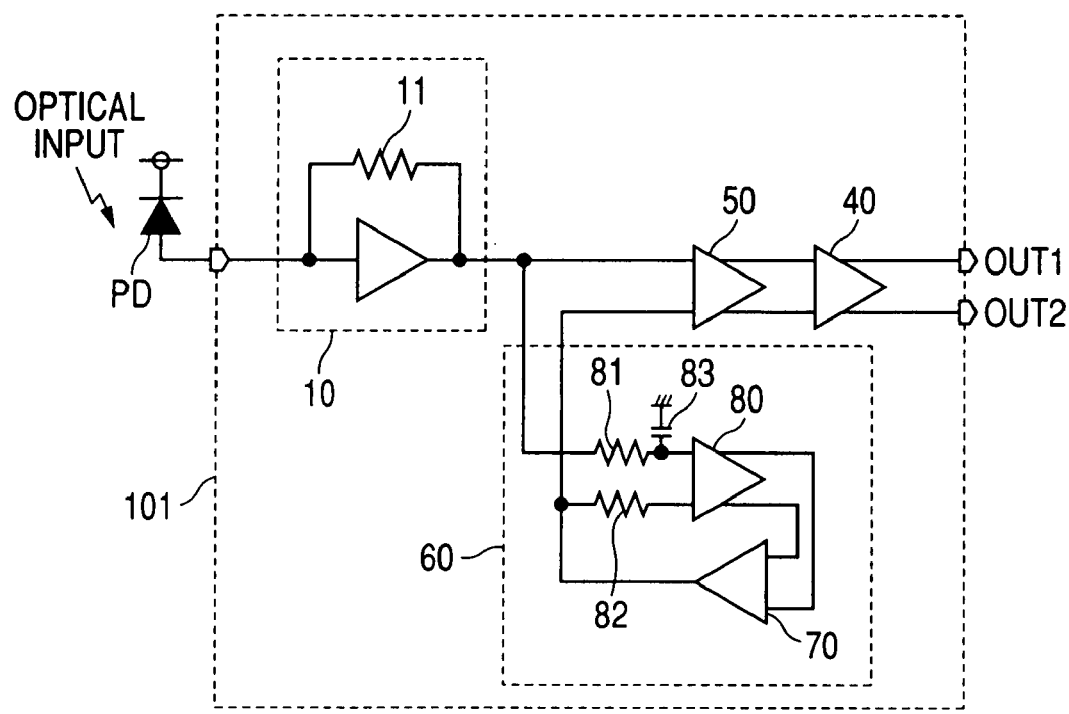
FIG. 2 is a configuration diagram of an optical signal receiving circuit to which the invention is applied.

FIG. 2 shows a second embodiment of the optical signal receiving circuit to which the invention is applied. It differs from the first embodiment in that the voltage generating circuit 60 is configured of a feedback loop using an error amplifier. The voltage generating circuit 60 includes a resistor 81 and a capacitor 83 constituting a low-pass filter, a differential circuit 80, an input-voltage-offset compensating resistor 82 of the differential circuit 80, and an error amplifier 70.

The voltage signal input to the voltage generating circuit 60 is turned into an average voltage level by extraction of its DC component through the low-pass filter configured of the resistor 81 and the capacitor 83, and the signal is input to one input terminal of the differential circuit 80. At this time, since the amplitude is limited by the low-pass filter and, in addition, the feedback loop does not need wide bandwidth, the differential circuit 80 does not need to use a resistor for its current source as the differential circuit 50 in the main path, but it may be provided by a common constant current source employing a transistor. The output of the differential circuit 80 is connected to the input of the error amplifier 70. The output of the error amplifier is connected to the input of the differential circuit 50 as the reference voltage level and, at the same time, it is connected to the other input of the differential circuit 80 through the resistor 82 and thus the feedback loop is constituted. Here, by using a resistor ideally of the same resistance value as the resistor 81 for the resistor 82, it becomes possible to equalize the offset voltage caused by the base currents at the input terminals occurring in the case where a bipolar transistor circuit is used for the differential circuit 80.

According to this embodiment, it is made possible to increase the value of the resistor 81 constituting the low-pass filter and to decrease the capacitance of the capacitor 83; accordingly, it is made easy to form the capacitor 83 on the same semiconductor substrate as other circuits. Further, by having a small capacitor element incorporated in the error amplifier 70 and decreasing the bandwidth of the feedback loop, it is made easy to configure the entire circuit on the same semiconductor substrate.

What is claimed is:

1. An optical signal receiving circuit comprising:
a current-voltage converting circuit receiving a current signal output from a photoelectric converting circuit, and converting the current signal into a voltage signal, the photoelectric converting circuit receiving an optical signal and converting the optical signal into the current signal;
a voltage generating circuit receiving the voltage signal output from said current-voltage converting circuit and generating a DC voltage based on the voltage signal; and
a first differential circuit receiving the voltage signal output from said current-voltage converting circuit and the DC voltage output from said voltage generating circuit and generating a differential voltage signal based on the voltage signal and the DC voltage,
wherein said first differential circuit includes a pair of differential transistors and a current source commonly connected to the pair of transistors,
wherein the current source consists of at least one passive element,
wherein said voltage generating circuit includes a low-pass filter, and
wherein said voltage generating circuit further includes a second differential circuit having said low-pass filter coupled with one of differential inputs of said second differential circuit.

2. The optical signal receiving circuit according to claim 1, wherein
transistors of said optical signal receiving circuit and a capacitor of the low-pass filter are formed on a single semiconductor substrate.

3. An optical signal receiving device, comprising:
an optical signal receiving circuit receiving a current signal generated by photoelectric conversion of an optical signal and converting the current signal into a differential voltage signal;
wherein said optical signal receiving circuit is adapted to operate with a single voltage power supply, has a feed-forward connection, and generates the differential voltage signal by differential conversion based on a common voltage signal through the feed-forward connection, the common voltage signal being generated by current-voltage conversion of the current signal, wherein the feed-forward connection includes a voltage generating circuit generating a DC voltage component of the common voltage signal, wherein the differential voltage signal is generated by comparing with the common voltage signal and the DC voltage component of the common voltage signal, wherein said voltage generating circuit includes a low-pass filter, and wherein said voltage generating circuit further includes a differential circuit having said low-pass filter coupled with one of its differential input.

4. The optical signal receiving device according to claim 3, wherein transistors of said optical signal receiving circuit and a capacitor of said low-pass filter are formed on a single semiconductor substrate.

5. An optical signal receiving apparatus comprising:

a photoelectric converting circuit receiving an optical signal and converting the signal into a current signal; and an optical signal receiving circuit generating a differential voltage signal from the current signal output from said photoelectric converting circuit and outputting the signal, wherein said optical signal receiving circuit comprises:

a current-voltage converting circuit receiving a current signal output from a photoelectric converting circuit, and converting the current signal into a voltage signal, a voltage generating circuit receiving the voltage signal output from said current-voltage converting circuit and generating a DC voltage based on the voltage signal; and a first differential circuit receiving the voltage signal output from said current-voltage converting circuit and the DC voltage output from said voltage generating circuit and generating a differential voltage signal based on the voltage signal and the DC voltage;

wherein said first differential circuit includes a pair of differential transistors and a current source commonly connected to the pair of transistors, wherein the current source consists of at least one passive element, wherein said voltage generating circuit comprises a low-pass filter configured of a parallel connection of a resistor and a capacitor, and wherein said voltage generating circuit further comprises a second differential circuit having said low-pass filter as one of differential inputs thereof.

6. The optical signal receiving apparatus according to claim 5, wherein transistors of said optical signal receiving circuit and a capacitor of said low-pass filter are formed on a single semiconductor substrate.

7. An optical signal receiving circuit comprising:

a current-voltage convening circuit receiving a current signal output from a photoelectric converting circuit, and converting the current signal into a voltage signal, the photoelectric converting circuit receiving an optical signal and converting the optical signal into the current signal;

a voltage generating circuit receiving the voltage signal output from said current-voltage converting circuit and generating a first DC voltage based on the voltage signal; and a first differential circuit receiving the voltage signal output from said current-voltage converting circuit and the first DC voltage output from said voltage generating circuit and generating a differential voltage signal based on the voltage signal and the first DC voltage, wherein said first differential circuit includes a pair of differential transistors and a current source between a node commonly connected to the pair of transistors and a second voltage level and having a passive element, wherein there are no active elements between the node commonly connected to the pair of transistors and the second voltage level, wherein said voltage generating circuit includes a low-pass filter, and wherein said voltage generating circuit further includes a second differential circuit having said low-pass filter coupled with one of differential inputs thereof.

8. The optical signal receiving circuit according to claim 7, wherein transistors of said optical signal receiving circuit and a capacitor of the low-pass filter are formed on a single semiconductor substrate.

9. An optical signal receiving circuit comprising:

a current-voltage converting circuit receiving a current signal output from a photoelectric converting circuit, and converting the current signal into a voltage signal, the photoelectric converting circuit receiving an optical signal and converting the optical signal into the current signal;

a voltage generating circuit receiving the voltage signal output from said current-voltage converting circuit and generating a DC voltage based on the voltage signal; and a first differential circuit receiving the voltage signal output from said current-voltage converting circuit and the DC voltage output from said voltage generating circuit and generating a differential voltage signal based on the voltage signal and the DC voltage, wherein said first differential circuit includes a pair of differential transistors and a current source between a node commonly connected to the pair of transistors, wherein a current flowing through the current source varies according to the voltage signal input to the differential circuit, wherein said voltage generating circuit includes a low-pass filter, and wherein said voltage generating circuit further includes a second differential circuit having said low-pass filter coupled with one of differential inputs thereof.

10. The optical signal receiving circuit according to claim 9, wherein transistors of said optical signal receiving circuit and a capacitor of the low-pass filter are formed on a single semiconductor substrate.

* * * * *